(12) United States Patent
Gonzalez de Langarica et al.

(10) Patent No.: US 11,831,691 B2
(45) Date of Patent: Nov. 28, 2023

(54) USER EQUIPMENT REGISTRATIONS MANAGEMENT

(71) Applicant: Telefonaktiebolaget LM Ericsson (publ), Stockholm (SE)

(72) Inventors: Ester Gonzalez de Langarica, Vitoria-Gasteiz (ES); Charles Hegarty, Bromma (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 305 days.

(21) Appl. No.: 17/285,126

(22) PCT Filed: Oct. 16, 2018

(86) PCT No.: PCT/EP2018/078310
§ 371 (c)(1),
(2) Date: Apr. 14, 2021

(87) PCT Pub. No.: WO2020/078542
PCT Pub. Date: Apr. 23, 2020

(65) Prior Publication Data
US 2021/0360041 A1 Nov. 18, 2021

(51) Int. Cl.
*H04L 65/1073* (2022.01)
*H04W 4/50* (2018.01)
(Continued)

(52) U.S. Cl.
CPC ......... *H04L 65/1073* (2013.01); *H04W 4/025* (2013.01); *H04W 4/50* (2018.02);
(Continued)

(58) Field of Classification Search
CPC ............ H04L 65/1073; H04L 65/1104; H04L 65/1016; H04W 4/025; H04W 4/50; H04W 4/60; H04W 8/18; H04W 60/00
See application file for complete search history.

(56) References Cited

U.S. PATENT DOCUMENTS

| | | |
|---|---|---|
| 2009/0191870 A1 | 7/2009 | Siegel et al. |
| 2010/0008352 A1 | 1/2010 | Przybysz et al. |

(Continued)

FOREIGN PATENT DOCUMENTS

WO  2016012034 A1  1/2016

OTHER PUBLICATIONS

Calhoun, P., et al., "Diameter Base Protocol", Internet Engineering Task Force, Network Working Group, Request for Comments: 3588, Category: Standards Track, Sep. 2003, pp. 1-147.

(Continued)

*Primary Examiner* — Wayne H Cai
(74) *Attorney, Agent, or Firm* — Murphy, Bilak & Homiller, PLLC

(57) ABSTRACT

There is provided a method of operating a server of a network for managing user equipment registrations. The method comprises receiving (100) information indicative of whether user equipments are currently registered to a service, storing (102) the received information indicative of whether user equipments are currently registered to a service. The method also comprises receiving (104) a request associated with managing current registrations to services for one or more user equipments and initiating (106) an action to manage current registrations to services for one or more user equipments in accordance with the request.

14 Claims, 9 Drawing Sheets

(51) Int. Cl.
*H04W 4/02* (2018.01)
*H04W 8/18* (2009.01)
*H04W 60/00* (2009.01)
H04L 65/1016 (2022.01)
H04L 65/1104 (2022.01)

(52) U.S. Cl.
CPC ............ *H04W 8/18* (2013.01); *H04W 60/00* (2013.01); *H04L 65/1016* (2013.01); *H04L 65/1104* (2022.05)

(56) References Cited

U.S. PATENT DOCUMENTS

2013/0019012 A1  1/2013  Henrikson et al.
2016/0135139 A1  5/2016  Jahangir et al.
2018/0198830 A1* 7/2018  Wallis ................. H04L 65/1023

OTHER PUBLICATIONS

Garcia-Martin, M., et al., "Diameter Session Initiation Protocol (SIP) Application", Network Working Group, Request for Comments: 4740, Category: Standards Track, Nov. 2006, 1-72.

* cited by examiner

USER EQUIPMENT REGISTRATIONS MANAGEMENT

TECHNICAL FIELD

The present idea relates to a server, a database, a network and methods of operating the same for managing user equipment registrations.

BACKGROUND

With the ever increasing technological advancements in the field of user equipments (UEs), many users may own and/or use a multitude of UEs. For example, the UEs may include a work phone, a home phone, a mobile phone (e.g. a smartphone), a tablet, a smart watch, a laptop, a television, etc. IP multimedia subsystems (IMSs), such as rich communication services (RCSs), voice over long-term evolution (VoLTE), voice over W-Fi (VoWIFI), and so on, now also support multiple UEs per user.

However, having multiple UEs per user means that it can be difficult for a user to manage their UEs. In particular, it can be difficult for the user to manage the services to which their UEs are registered. A user may not only own and/or use a multitude of UEs, but those UEs may also be registered to multiple services. For example, the UEs may be registered to services such as a multimedia telephony service (MMTel) and other services. Moreover, in addition to the user being registered to one or more services from one or more UEs they own, the user may also be registered to one or more services from other UEs, such as a personal computer (PC) at a cyber café, library, or other location. It may be the case that a user forgets to deregister one or more UEs from one or more services. This creates a security risk as a third party can, for example, impersonate the user when making a call, requesting a file transfer or online chat, etc.

It is therefore important to be able to manage user equipment (UE) registrations. Current standardized technology allows a mobile network operator (MNO) to handle the registrations of UEs via administrative means. For example, an MNO can deregister a particular user equipment, bar the user equipment, or delete an entire subscription. However, a user currently does not have the same freedom. Although a user can deregister a UE from a service, the user can only currently do so from the particular UE that is registered to the service. This can be cumbersome for the user, particularly when the user may own and/or use a multitude of UEs. Some services may inform the user that there are active sessions on a UE and the user can then choose to close the sessions. However, even then, the user still has to close the session from the particular UE on which the session is active. In addition to being cumbersome, it can even be impossible for the user to manage UE registrations where the user is no longer at the same location as the UE for which registrations are to be managed. The security risk mentioned earlier thus still remains.

As such, there is a need for an improved mechanism for managing user equipment registrations, which overcomes at least some of the problems associated with existing mechanisms.

SUMMARY

It is an object to obviate or eliminate at least some of the above disadvantages associated with existing mechanisms and provide an improved mechanism for managing user equipment registrations.

Therefore, according to an aspect of the idea, there is provided a method of operating a server of a network for managing user equipment registrations. The method comprises receiving information indicative of whether user equipments are currently registered to a service and storing the received information indicative of whether user equipments are currently registered to a service. The method also comprises receiving a request associated with managing current registrations to services for one or more user equipments and initiating an action to manage current registrations to services for one or more user equipments in accordance with the request.

The idea thus provides an improved mechanism for managing user equipment registrations. This mechanism is improved as it allows a user to manage their user equipment registrations in a centralized way. That is, there is provided a unified or centralized view of all user equipment registrations to services. Thus, a mechanism for user equipment registration self-management is advantageously provided. A user can manage their user equipment registrations irrespective of their location with respect to the user equipments in a simple and yet effective manner. As it is easier and more feasible for the user to manage their user equipment registrations, the user is more likely to manage their user equipment registrations appropriately and effectively. In this way, security is improved since a user can deregister or bar one or more user equipments from one or more services at any place and at any time to avoid the risk of a third party impersonating the user.

In some embodiments, the request may comprise a request for information indicative of whether the one or more user equipments are currently registered to a service and initiating the action may comprise transmitting information indicative of whether the one or more user equipments are currently registered to a service. In this way, a user can easily access details of current user equipment registrations to be able to manage those user equipment registrations in an appropriate and effective manner.

In some embodiments, the method may comprise receiving information indicative of a current location of user equipments and storing the received information indicative of a current location of user equipments. In these embodiments, initiating the action may comprise transmitting information indicative of the current location of the one or more user equipments currently registered to a service. As the server of the network is operated to store the received information indicative of a current location of user equipments, the received information is stored by a network entity and thus it is possible for the received information to be shared to a number of users, e.g. end users or applications.

In some embodiments, initiating the action may comprise transmitting a command to a database of the network. In these embodiments, the database may be configured to manage user equipment registrations and the command may instruct the database to initiate the action. Thus, rather than a manual command, a dynamic network initiated command is advantageously used.

In some embodiments, the request may comprise a request to deregister one or more user equipments from one or more services to which the one or more user equipments are currently registered and the command may instruct the database to deregister the one or more user equipments from the one or more services to which the one or more user equipments are currently registered.

In some embodiments, the request may comprise a request to bar one or more user equipments from one or more services to which the one or more user equipments are currently registered and the command may instruct the database to bar the one or more user equipments from the one or more services to which the one or more user equipments are currently registered.

In some embodiments, the request may comprise a request to unbar one or more user equipments from one or more services to which the one or more user equipments are currently registered and the command may instruct the database to unbar the one or more user equipments from the one or more services to which the one or more user equipments are currently registered.

In some embodiments, the method may comprise storing an indication of an identity of the one or more user equipments and/or a contact for the one or more user equipments. Thus, the identity of the one or more user equipments and/or the contact for the one or more user equipments is available centrally within the network.

In some embodiments, receiving the request may comprise receiving the request from an application. Thus, the mechanism described herein can be extended to applications that can assist the user in their self-management tasks.

In some embodiments, the request may be input by the application at a northbound interface. The northbound interface may have a login mechanism for the application to input the request that is separate to a login mechanism for the application to register one or more user equipments to one or more services. In this way, malicious use of the user equipment registration self-management can be prevented, e.g. in case a user loses a user equipment with an active registration to one or more services.

In some embodiments, the application may be an over-the-top, OTT, application. This enables secure integration with an eco-system that is external to the domain of the network operator.

In some embodiments, receiving the request may comprise receiving the request from a user equipment. In this way, the usability for the end user can be enhanced.

In some embodiments, the request may be input by a user at a user interface. The user interface may have a login mechanism for the user to input the request that is separate to a login mechanism for the user to register one or more user equipments to one or more services. In this way, malicious use of the user equipment registration self-management can be prevented, e.g. in case a user loses a user equipment with an active registration to one or more services.

According to another aspect of the idea, there is provided a server of a network. The server comprises a memory configured to receive information indicative of whether user equipments are currently registered to a service and store the received information indicative of whether user equipments are currently registered to a service. The server also comprises processing circuitry configured to receive a request associated with managing current registrations to services for one or more user equipments and initiate an action to manage current registrations to services for one or more user equipments in accordance with the request. The idea thus provides the advantages discussed earlier in respect of the method of operating the server.

According to another aspect of the idea, there is provided a method of operating a database of a network for managing user equipments. The method comprises receiving a command from a server of the network. The command instructs the database to initiate an action in accordance with a request received by the server and associated with managing current registrations to services for one or more user equipments. The method also comprises initiating the action to manage current registrations to services for one or more user equipments in accordance with the request. The idea thus provides the advantages discussed earlier in respect of the method of operating the server.

According to another aspect of the idea, there is provided a database of a network. The database is configured to receive a command from a server of the network. The command instructs the database to initiate an action in accordance with a request received by the server and associated with managing current registrations to services for one or more user equipments. The database is also configured to initiate the action to manage current registrations to services for one or more user equipments in accordance with the request. The idea thus provides the advantages discussed earlier in respect of the method of operating the server.

According to another aspect of the idea, there is provided a network comprising any one or more of: a server as described earlier, a database as described earlier, and a server as described earlier and a database as described earlier. The idea thus provides the advantages discussed earlier in respect of the method of operating the server.

According to another aspect of the idea, there is provided a computer program product comprising a carrier containing instructions for causing processing circuitry to perform a method as described earlier. The idea thus provides the advantages discussed earlier in respect of the method of operating the server.

Thus, an improved mechanism for managing user equipment registrations is provided.

BRIEF DESCRIPTION OF THE DRAWINGS

For a better understanding of the idea, and to show how it may be put into effect, reference will now be made, by way of example, to the accompanying drawings, in which.

DETAILED DESCRIPTION

As mentioned earlier, there is described herein an improved mechanism for managing user equipment (UE) registrations.

Herein, references to user equipments (UEs) can include any device, or any combination of devices, that may be used by an end user to communicate. Examples of a UE include, but are not limited to, a mobile device (e.g. a mobile phone, a smartphone, a smartwatch, a tablet, a laptop, or any other mobile device), a personal computer, or any other UE, or any combination of UEs. The UE registrations are services to which a UE is registered. Examples of a service include, but are not limited to, a web service, a personal assistant (PA) service, a messaging service, or any other service, or any combination of services. The UE registrations referred to herein may be for different UEs at different locations.

Figure 1:
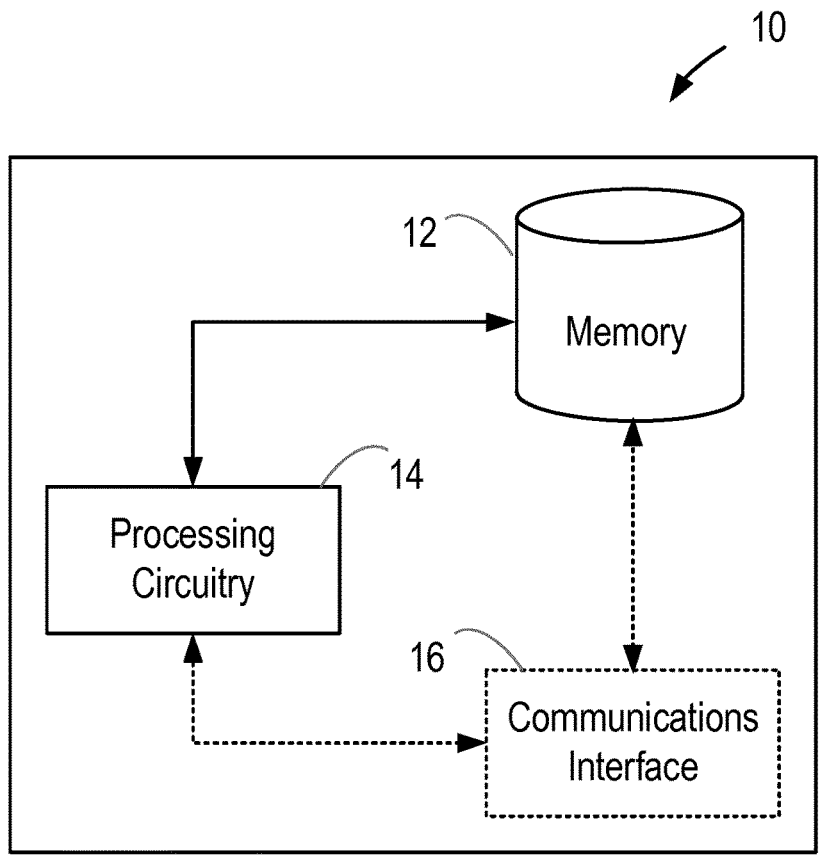
FIG. 1 is a block diagram illustrating a server according to an embodiment.

FIG. 1 illustrates a server 10 of a network in accordance with an embodiment. The server 10 can also be referred to as a registration management server. In some embodiments, the server 10 may be an application server, such as a registration management application server (RM-AS). In some embodiments, the network described herein can be a network of an IP multimedia subsystem (IMS). Thus, the network may be an IMS network according to some embodiments.

As illustrated in FIG. 1, the server 10 comprises a memory 12. The memory 12 of the server 10 can comprise a volatile memory or a non-volatile memory. In some embodiments, the memory 12 of the server 10 may comprise a non-transitory media. Examples of the memory 12 of the server 10 include, but are not limited to, a random access memory (RAM), a read only memory (ROM), a mass storage media such as a hard disk, a removable storage media such as a compact disk (CD) or a digital video disk (DVD), and/or any other memory.

Briefly, the memory 12 of the server 10 is configured to receive information indicative of whether UEs are currently registered to a service and store the received information indicative of whether UEs are currently registered to a service. UEs may be currently registered to a service where UEs have an active registration to a service, e.g. where UEs are in an active session with a service or where UEs have an established (or ongoing) connection with a service.

As illustrated in FIG. 1, the server 10 also comprises processing circuitry (or logic) 14. The processing circuitry 14 controls the operation of the server 10 and can implement the method described herein in relation to the server 10. The processing circuitry 14 can comprise one or more processors, processing units, multi-core processors or modules that are configured or programmed to control the server 10 in the manner described herein. In particular implementations, the processing circuitry 14 can comprise a plurality of software and/or hardware modules that are each configured to perform, or are for performing, individual or multiple steps of the method described herein in relation to the server 10.

Briefly, the processing circuitry 14 of the server 10 is configured to receive a request associated with managing current registrations to services for one or more UEs and initiate an action to manage current registrations to services for one or more UEs in accordance with the request.

The processing circuitry 14 of the server 10 can be connected to the memory 12 of the server 10. In some embodiments, the memory 12 of the server 10 may be configured to store program code or instructions that can be executed by the processing circuitry 14 of the server 10 to perform the method described herein in relation to the server 10. Alternatively or in addition, the memory 12 of the server 10 can be configured to store any requests, responses, indications, information, data, notifications, signals, or similar, that are described herein. The processing circuitry 14 of the server 10 may be configured to control the memory 12 of the server 10 to store any requests, responses, indications, information, data, notifications, signals, or similar, that are described herein. In some embodiments, for example, the processing circuitry 14 of the server 10 may be configured to control the memory 12 of the server 10 to store the received information indicative of whether UEs are currently registered to a service.

In some embodiments, as illustrated in FIG. 1, the server 10 may optionally comprise a communications interface 16. The communications interface 16 of the server 10 can be connected to the memory 12 of the server and/or the processing circuitry 14 of the server 10. The communications interface 16 of the server 10 may be operable to communicate with other nodes of the network (such as a database of the network that will be described later, or any other nodes of the network, or any combination of other nodes of the network). For example, the communications interface 16 of the server 10 can be configured to transmit to and/or receive from other nodes requests, responses, indications, information, data, notifications, signals, or similar, that are described herein. The processing circuitry 14 of the server 10 may be configured to control the communications interface 16 of the server 10 to transmit to and/or receive from other nodes requests, responses, indications, information, data, notifications, signals, or similar, that are described herein.

It will be appreciated that FIG. 1 only shows the components required to illustrate an embodiment of the server 10 and, in a practical implementation, the server 10 may comprise additional or alternative components to those shown.

Figure 2:
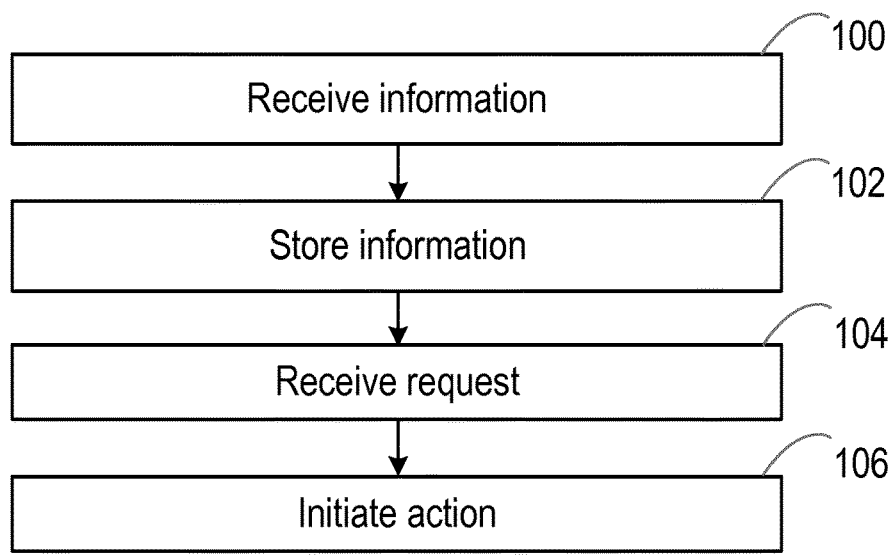
FIG. 2 is a block diagram illustrating a method of operating a server according to an embodiment.

FIG. 2 is a flowchart illustrating a method of operating the server 10 of the network for managing UE registrations in accordance with an embodiment. The method of FIG. 2 can be performed by or under the control of the processing circuitry 14 of the server 10.

With reference to FIG. 2, at block 100, information indicative of whether UEs are currently registered to a service is received. More specifically, the memory 12 of the server 10 receives this information (e.g. via the communications interface 16 of the server 10). As mentioned earlier, UEs may be currently registered to a service where UEs have an active registration to a service, e.g. where UEs are in an active session with a service or where UEs have an established (or ongoing) connection to a service.

The information indicative of whether UEs are currently registered to a service is received from the network. For example, in some embodiments, receiving the request may comprise receiving the request from a UE. Alternatively or in addition, in some embodiments, receiving the request may comprise receiving the request from an application, such as an over-the-top (OTT) application, a third party application (e.g. a digital assistant) and/or a web application. Thus, the mechanism described herein can be extended to applications that can assist the user in their self-management tasks. In some embodiments, the mechanism described herein can be extended to applications via one or more exposure application programming interfaces (APIs). Thus, the memory 12 of the server 10 can receive requests from one or more applications and/or one or more UEs.

In some embodiments where the request is received from one or more applications, the request may be input by the application at a northbound interface of the network. In some embodiments, the northbound interface can have a login mechanism for the application to input the request. The login mechanism for the application to input the request may be separate to a login mechanism for the application to register one or more UEs to one or more services. For example, the login mechanism for the application to input the request may require different login credentials to the login mechanism for the application to register one or more UEs to one or more service.

In some embodiments where the request is received from one or more UEs, the request may be input by a user at a user interface, such as a graphical user interface (GUI). In some embodiments, the user interface can have a login mechanism for the user to input the request. The login mechanism for the user to input the request may be separate to a login mechanism for the user to register one or more UEs to one or more services. For example, the login mechanism for the user to input the request may require different login credentials to the login mechanism for the user to register one or more UEs to one or more service.

Returning back to FIG. 2, at block 102, the received information indicative of whether UEs are currently registered to a service is stored. More specifically, the memory 12 of the server 10 stores this received information. In some embodiments, the processing circuitry 14 of the server 10 may control the memory 12 of the server 10 to store this received information.

At block 104 of FIG. 2, a request associated with managing current registrations to services for one or more UEs is received. More specifically, the processing circuitry 14 of the server 10 receives the request (e.g. via the communications interface 16 of the server 10). The request can be received via an interface of the network, such as via a hypertext transfer protocol (HTTP) interface or an XML configuration access protocol (XCAP) interface. At block 106 of FIG. 2, an action is initiated to manage current registrations to services for one or more UEs in accordance with the request. More specifically, the processing circuitry 14 of the server 10 initiates the action.

In some embodiments, the request received at block 104 of FIG. 2 may comprise a request for information indicative of whether the one or more UEs are currently registered to a service. In these embodiments, at block 106 of FIG. 2, initiating the action may comprise transmitting information indicative of whether the one or more UEs are currently registered to a service. Thus, upon demand, information indicative of whether the one or more UEs are currently registered to a service 40 can be provided.

In some embodiments, the information indicative of whether the one or more UEs are currently registered to a service may be transmitted via an interface, such as an application programming interface (API), which may be denoted as the "getListofRegisteredDevices" API. In some embodiments, the information indicative of whether the one or more UEs are currently registered to a service may be transmitted upon invocation of this API. The API may, for example, be a hypertext transfer protocol representational state transfer API (HTTP-REST API). In some embodiments, the information may be provided in a JavaScript object notation (JSON) format, an extensible markup language (XML) format, or any other format.

In some embodiments, the information indicative of whether the one or more UEs are currently registered to a service may be processed and/or rendered to a user (e.g. at a user interface, such as a GUI) and/or to an application, such as rendered at the UE and/or to the application from which the request was received. In some embodiments where the information is rendered, a list of (e.g. active) user equipment registrations may be rendered. In some embodiments, a menu may also be rendered with the information. For example, the menu may comprise at least one option for managing the user equipment registrations (such as an option to register or reregister one or more UEs from one or more services, an option to deregister one or more UEs from one or more services, an option to bar one or more UEs from one or more services, and/or an option to unbar one or more UEs from one or more services). The at least one option can be selectable. In this way, a user or application can manage one of the UE registrations or all of the UE registrations at the same time.

Although not illustrated in FIG. 2, in some embodiments, the method may comprise receiving information indicative of a current location (e.g. geolocation) of UEs. More specifically, the memory 12 of the server 10 may be configured to receive this information (e.g. via the communications interface 16 of the server 10). This information can be received from the network. For example, in some embodiments, this information may be received from a database (or repository) of the network. The database may, for example, be a home subscriber server (HSS) database or a subscriber location function (SLF) database.

In some embodiments, the method may also comprise storing the received information indicative of a current location of UEs. More specifically, the memory 12 of the server 10 may be configured to store this received information. In some of these embodiments, at block 106 of FIG. 2, initiating the action may comprise transmitting information indicative of the current location of the one or more UEs currently registered to a service. In some embodiments, the information indicative of whether the one or more UEs are currently registered to a service may be transmitted via an interface, such as the Sh interface.

In some embodiments, at block 106 of FIG. 2, initiating the action may comprise transmitting a command to a database (or repository) of the network. More specifically, the processing circuitry 14 of the server 10 can be configured to transmit the command to the database. In these embodiments, the command instructs the database to initiate the action. The database can be a database configured to manage UE registrations. The database may, for example, be a HSS database or a SLF database.

In some embodiments where the command is transmitted to the database, the request received at block 104 of FIG. 2 may comprise a request to deregister one or more UEs from one or more services to which the one or more UEs are currently registered. In these embodiments, the command may instruct the database to deregister the one or more UEs from the one or more services to which the one or more UEs are currently registered. Thus, upon demand, deregistration of one or more UEs from one or more services can be achieved.

In some embodiments, the command that instructs the database to deregister the one or more UEs from the one or more services to which the one or more UEs are currently registered may be transmitted via an interface, such as an application programming interface (API), which may be denoted as the "deregisterDevice( )" API or the "deregisterAllDevices( )" API. In some embodiments, the command that instructs the database to deregister the one or more UEs from the one or more services to which the one or more UEs are currently registered may be transmitted upon invocation of this API. The API may, for example, be a HTTP-REST API. Thus, according to some embodiments, a single (e.g. a particular) UE or multiple UEs can be deregistered from one or more services. This function can be useful to terminate a forgotten session of a UE (e.g. from a web browser) to a service, such as where the UE does not have authentication information stored therein. The UE will not be able to reregister for the service again unless the correct logon credentials are provided.

Alternatively or in addition, in some embodiments where the command is transmitted to the database, the request received at block 104 of FIG. 2 may comprise a request to bar one or more UEs from one or more services to which the one or more UEs are currently registered. In these embodiments, the command may instruct the database to bar the one or more UEs from the one or more services to which the one or more UEs are currently registered. Thus, upon demand, barring of one or more UEs from one or more services can be achieved.

In some embodiments, the command that instructs the database to bar the one or more UEs from the one or more services to which the one or more UEs are currently registered may be transmitted via an interface, such as an application programming interface (API), which may be denoted as the "barDevice( )" API. In some embodiments, the command that instructs the database to bar the one or more UEs from the one or more services to which the one or more UEs are currently registered may be transmitted upon invocation of this API. The API may, for example, be a hypertext transfer protocol (HTTP) API. Thus, according to some embodiments, a single (e.g. a particular) UE or multiple UEs can be barred from one or more services. This function can be useful to terminate (e.g. from a web browser) a session of a UE to a service, such as where the UE does not have authentication information stored therein, e.g. in the case of a forgotten, lost, or stolen UE. The UE will not be able to reregister for the service again until it has been unbarred.

Alternatively or in addition, in some embodiments where the command is transmitted to the database, the request received at block 104 of FIG. 2 may comprise a request to unbar one or more UEs from one or more services to which the one or more UEs are currently registered. In these embodiments, the command may instruct the database to unbar the one or more UEs from the one or more services to which the one or more UEs are currently registered. Thus, upon demand, unbarring of one or more UEs from one or more services can be achieved.

In some embodiments, the command that instructs the database to unbar one or more UEs from one or more services to which the one or more UEs are currently registered may be transmitted via an interface, such as an application programming interface (API), which may be denoted as the "unbarDevice( )" API. In some embodiments, the command that instructs the database to unbar the one or more UEs from the one or more services to which the one or more UEs are currently registered may be transmitted upon invocation of this API. The API may, for example, be a HTTP-REST API. Thus, according to some embodiments, a single (e.g. a particular) UE or multiple UEs can be unbarred from one or more services. This function can be useful to allow one or more UEs to be reregistered to one or more services again after those one or more UEs have been barred, such as where a forgotten, lost, or stolen UEs is retrieved by the user.

In some embodiments, a request to deregister, bar and/or unbar one or more UEs from one or more services to which the one or more UEs are currently registered may be received by the processing circuitry 14 of the server 10 following the processing circuitry 14 of the server 10 transmitting the information indicative of whether the one or more UEs are currently registered to a service.

Although some examples have been provided for the request associated with managing current registrations to services for one or more UEs (which is received at block 104 of FIG. 2), it will be understood that any other requests, and any combination of requests, associated with managing current registrations to services for one or more UEs are also possible. Similarly, although examples have been provided for the action to manage current registrations to services for one or more UEs (which is initiated at block 106 of FIG. 2), it will be understood that any other actions, and any combination of actions, to manage current registrations to services for one or more UEs are also possible.

Although not illustrated in FIG. 2, in some embodiments, the method may comprise storing an indication of an identity (ID) of the one or more UEs and/or a contact for the one or more user UEs. Each of the one or more UEs can have a unique ID. In some embodiments, the ID may be a media access control (MAC) address, a globally routable user agent uniform resource identifier (GRUU), or any other type of ID. In some embodiments, the ID of the one or more UEs may be translated into an IP multimedia private identity (IMPI). The contact for a UE can be the contact in respect of which the UE is registered to a service. In some embodiments, the ID of the one or more UEs and/or the contact for the one or more UEs may be rendered to a user (e.g. at a user interface, such as a GUI) and/or to an application, such as rendered at the UE and/or to the application from which the request was received.

An example of the information that the memory 12 of the server 10 may be configured to store according to some embodiments is illustrated in the following table:

| ID | Initial registration timestamp | Location | Client/ Browser | Contact |
| --- | --- | --- | --- | --- |
| PC home | Sunday 01st March 2014 01:00 GMT | Stockholm | Browser (Chrome) | userA@telia.com |
| Mobile phone | Saturday 02nd April 2014 03:00 GMT | Goteborg | Mobile (Android) | 761153812@telia.com |
| Tablet | . . . | . . . | . . . | . . . |

The processing circuitry 14 of the server 10 can be configured to transmit any or all of the information illustrated in the table. Any or all of the information illustrated in the table may also be rendered to a user (e.g. at a user interface, such as a GUI) and/or to an application, such as rendered at the UE and/or to the application from which the request was received.

Figure 3:
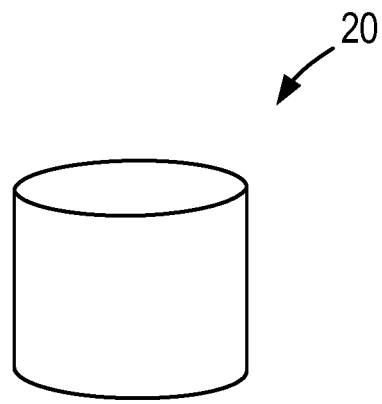
FIG. 3 is a block diagram illustrating a database according to an embodiment.

FIG. 3 illustrates a database (or repository) 20 of the network in accordance with an embodiment. In some embodiments, the database 20 may be a home subscriber server (HSS) database or a subscriber location function (SLF) database. As mentioned earlier, in some embodiments, the network described herein can be a network of an IP multimedia subsystem (IMS). Thus, the network may be an IMS network according to some embodiments.

The database 20 can be configured to store any requests, responses, indications, information, data, notifications, signals, or similar, that are described herein. The database 20 can comprise a volatile database or a non-volatile database. In some embodiments, the database 20 may comprise a non-transitory media. Examples of the database 20 include, but are not limited to, a random access memory (RAM), a read only memory (ROM), a mass storage media such as a hard disk, a removable storage media such as a compact disk (CD) or a digital video disk (DVD), and/or any other memory.

Briefly, the database 20 is configured to receive a command from a server 10 of the network. The command instructs the database 20 to initiate an action in accordance with a request received by the server 10 and associated with managing current registrations to services for one or more UEs. The database 20 is also configured to initiate the action to manage current registrations to services for one or more UEs in accordance with the request.

Figure 4:
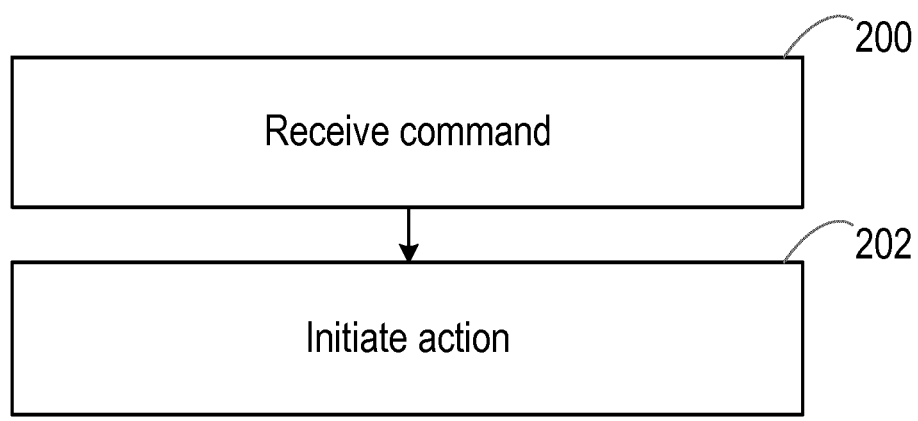
FIG. 4 is a block diagram illustrating a method of operating a database according to an embodiment.

FIG. 4 is a flowchart illustrating a method of operating the database (or repository) 20 of the network for managing UEs in accordance with an embodiment.

With reference to FIG. 4, at block 200, a command is received from a server 10 of the network. More specifically, the database 20 receives the command. The command instructs the database 20 to initiate an action in accordance with a request received by the server 10 and associated with managing current registrations to services for one or more UEs. At block 202 of FIG. 4, the action is initiated to manage current registrations to services for one or more UEs in accordance with the request. More specifically, the database 20 initiates the action.

As mentioned earlier, in some embodiments, the request may comprise a request to deregister one or more UEs from one or more services to which the one or more UEs are currently registered. In these embodiments, the command may instruct the database to deregister the one or more UEs from the one or more services to which the one or more UEs are currently registered. Thus, in these embodiments, the database 20 can be configured to initiate the action by being configured to deregister the one or more UEs from the one or more services to which the one or more UEs are currently registered. In some embodiments, the command that instructs the database to deregister the one or more UEs from the one or more services to which the one or more UEs are currently registered may be received via an interface, such as an application programming interface (API), e.g. a HTTP-REST API. Thus, according to some embodiments, a single (e.g. a particular) UE or multiple UEs can be deregistered from one or more services. This function can be useful to terminate a forgotten session of a UE (e.g. from a web browser) to a service, such as where the UE does not have authentication information stored therein. The UE will not be able to reregister for the service again unless the correct logon credentials are provided.

In some embodiments, the database 20 may be configured to deregister the one or more UEs from the one or more services to which the one or more UEs are currently registered by requesting the deregistration to a node, such as a serving call session control function (S-CSCF), of the network via which the one or more UEs are registered to the one or more services. In some embodiments, the database 20 can be configured to deregister the one or more UEs from the one or more services to which the one or more UEs are currently registered by being configured to deregister all intelligent management platform interfaces (IMPIs) of the one or more user interfaces (except for any IMPI that is used in the deregistration). This function is useful in case the one or more UEs have several active registrations to ensure there is no malicious use of those registrations.

Alternatively or in addition, in some embodiments, the request may comprise a request to bar one or more UEs from one or more services to which the one or more UEs are currently registered. In these embodiments, the command may instruct the database to bar the one or more UEs from the one or more services to which the one or more UEs are currently registered. Thus, in these embodiments, the database 20 can be configured to initiate the action by being configured to bar the one or more UEs from the one or more services to which the one or more UEs are currently registered. In some embodiments, the command that instructs the database to bar the one or more UEs from the one or more services to which the one or more UEs are currently registered may be received via an interface, such as an application programming interface (API), e.g. a HTTP API. Thus, according to some embodiments, a single (e.g. a particular) UE or multiple UEs can be barred from one or more services. This function can be useful to terminate (e.g. from a web browser) a session of a UE to a service, such as where the UE does not have authentication information stored therein, e.g. in the case of a forgotten, lost, or stolen UE. The UE will not be able to reregister for the service again until it has been unbarred.

In some embodiments, the database 20 may be configured to bar the one or more UEs from the one or more services to which the one or more UEs are currently registered by requesting the barring to a node, such as a S-CSCF, of the network via which the one or more UEs are registered to the one or more services. In some embodiments, the database 20 can be configured to bar the one or more UEs from the one or more services to which the one or more UEs are currently registered by being configured to bar all intelligent management platform interfaces (IMPIs) of the one or more user interfaces (except for any IMPI that is used in the barring). This function is useful in case the one or more UEs have several active registrations to ensure there is no malicious use of those registrations.

Alternatively or in addition, in some embodiments, the request may comprise a request to unbar one or more UEs from one or more services to which the one or more UEs are currently registered. In these embodiments, the command may instruct the database to unbar the one or more UEs from the one or more services to which the one or more UEs are currently registered. Thus, in these embodiments, the database 20 can be configured to initiate the action by being configured to unbar the one or more UEs from the one or more services to which the one or more UEs are currently registered. In some embodiments, the command that instructs the database to unbar one or more UEs from one or more services to which the one or more UEs are currently registered may be received via an interface, such as an application programming interface (API), e.g. a HTTP-REST API. Thus, according to some embodiments, a single (e.g. a particular) UE or multiple UEs can be unbarred from one or more services. This function can be useful to allow one or more UEs to be reregistered to one or more services again after those one or more UEs have been barred, such as where a forgotten, lost, or stolen UEs is retrieved by the user.

In some embodiments, the database 20 may be configured to unbar the one or more UEs from the one or more services to which the one or more UEs are currently registered by requesting the unbarring to a node, such as a S-CSCF, of the network via which the one or more UEs are registered to the one or more services. In some embodiments, the database 20 can be configured to unbar the one or more UEs from the one or more services to which the one or more UEs are currently registered by being configured to unbar all intelligent management platform interfaces (IMPIs) of the one or more user interfaces (except for any IMPI that is used in the unbarring). This function is useful in case the one or more UEs have several active registrations to ensure there is no malicious use of those registrations.

As mentioned earlier, although some examples have been provided for the request, it will be understood that any other requests, and any combination of requests, associated with managing current registrations to services for one or more UEs are also possible. Similarly, although examples have been provided for the action that the database 20 may be instructed to initiate, it will be understood that any other actions, and any combination of actions, to manage current registrations to services for one or more UEs are also possible.

Figure 5:
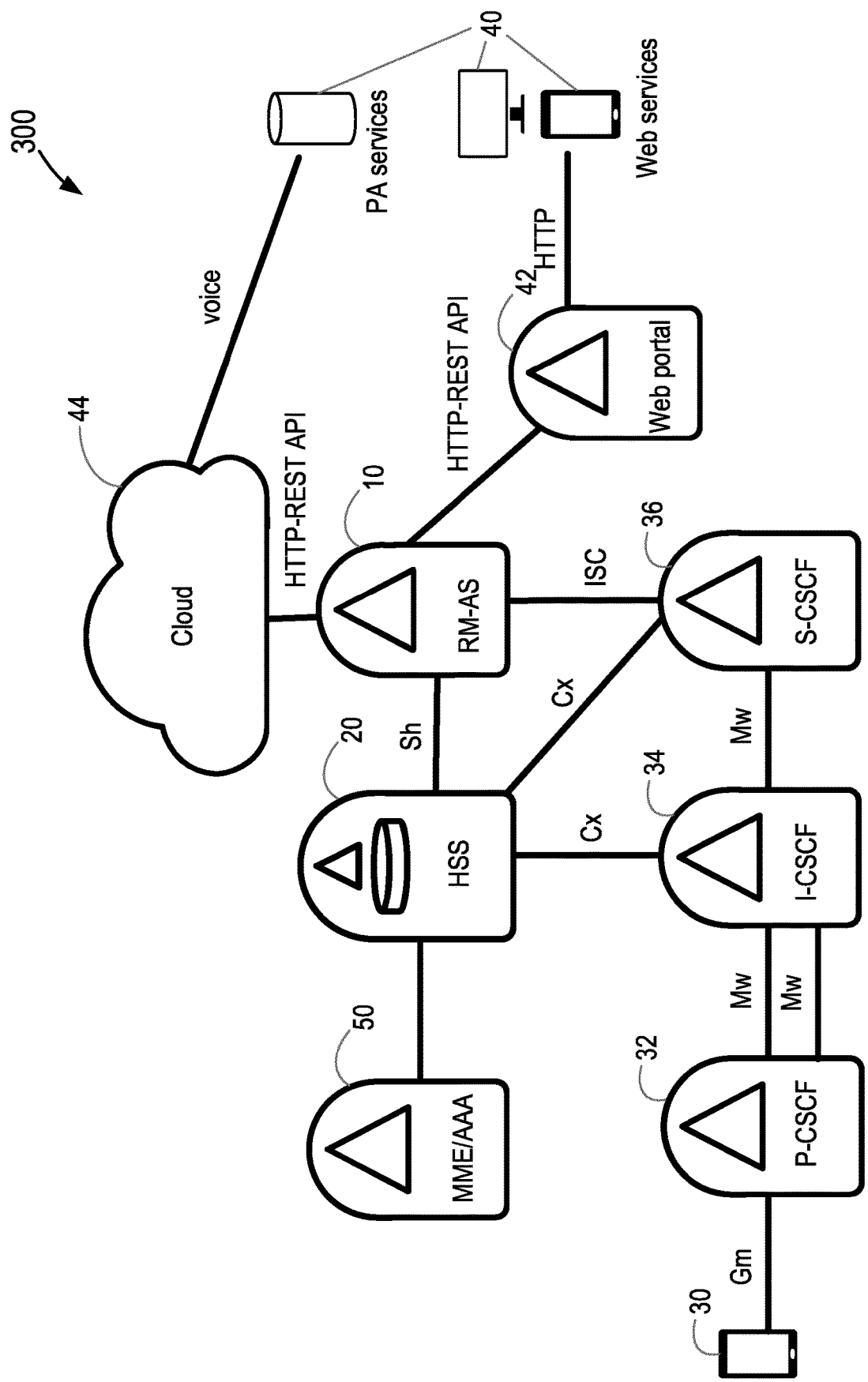
FIG. 5 is a block diagram illustrating a network according to an embodiment.

FIG. 5 illustrates a network 300 in accordance with an embodiment. The network 300 can be a 3G network, a 4G network, a 5G network, or any other generation network. As mentioned earlier, in some embodiments, the network 300 can be a network of an IP multimedia subsystem (IMS). Thus, the network may be an IMS network according to some embodiments.

The network 300 can comprise one or more servers 10, one or more databases 20, or one or more servers 10 and one or more databases 20. The one or more servers 10 of the network 300 are as described earlier with reference to FIGS. 1 and 2. In some embodiments, the one or more servers 10 may comprise one or more application servers, such as one or more registration management application servers (RM-ASs). The one or more databases 20 of the network 300 are as described earlier with reference to FIGS. 3 and 4. In some embodiments, the one or more databases 20 may comprise one or more home subscriber server (HSS) databases and/or one or more subscriber location function (SLF) databases. The one or more servers 10 can be configured to communicate with the one or more databases 20.

For simplicity, the network 300 of FIG. 5 is illustrated as comprising a single server 10 and a single database 20. However, it will be understood that the network 300 may comprise any other number of servers 10 and/or any other number of databases 20 according to other embodiments. As illustrated in FIG. 5, in some embodiments, a server 10 of the network 300 may be configured to communicate with a database 20 of the network 300 via an interface (such as an Sh interface) of the network 300.

In the manner described earlier, the memory 12 of the server 10 receives a request associated with managing current registrations to services 40 for one or more UEs 30. Thus, as illustrated in FIG. 5, the network 300 can comprise one or more UEs 30 and/or one or more services 40. As mentioned earlier, the memory 12 of the server 10 can receive the request from one or more UEs 30 and/or one or more applications (not illustrated in FIG. 5).

In some embodiments, one or more UEs 30 can communicate with (and thus transmit a request associated with managing current registrations to) the server 10 of the network 300. For example, one or more UEs 30 may communicate with the server 10 of the network 300 via one or more interfaces of the network 300 and/or one or more nodes 32, 34, 36 of the network 300. In some embodiments, the one or more nodes 32, 34, 36 may comprise one or more session initiation protocol (SIP) nodes. For example, in some embodiments, the one or more nodes 32, 34, 36 may comprise one or more call session control functions (CSCFs), such as any one or more of a proxy call session control function (P-CSCF) 32, an interrogating call session control function (I-CSCF) 34, serving call session control function (S-CSCF) 36, or any other SIP nodes, or any combination of SIP nodes.

In the embodiment illustrated in FIG. 5, for example, the one or more nodes 32, 34, 36 via which the one or more UEs 30 can communicate with (and thus transmit a request associated with managing current registrations to) the server 10 comprise the P-CSCF 32, I-CSCF 34 and/or S-CSCF 36. In more detail, in the embodiment illustrated in FIG. 5, the one or more UEs 30 can communicate with the P-CSCF 32 via an interface (such as a Gm interface) of the network 300. The P-CSCF 32 can communicate with the I-CSCF 34 via an interface (such as an Mw interface) of the network 300 and/or the I-CSCF 34 can communicate with the P-CSCF 32 via another interface (such as another Mw interface) of the network 300. The I-CSCF 34 can communicate with the S-CSCF 36 via an interface (such as an Mw interface) of the network 300. The I-CSCF 34 can communicate with the database 20 via an interface (such as a Cx interface) of the network 300 and/or the S-CSCF 36 can communicate with the database 20 via another interface (such as another Cx interface) of the network 300. The S-CSCF 36 may communicate with the server 10 via an interface (such as an ISC interface) of the network 300. The S-CSCF can be configured to provide one or more services 40 to the one or more UEs 30.

In some embodiments, one or more services 40 can communicate with the server 10 of the network 300. For example, one or more services 40 may communicate with the server 10 of the network 300 via one or more interfaces of the network 300 and/or one or more nodes 42, 44 of the network 300. In some embodiments, the one or more interfaces of the network 300 via which the one or more services 40 can communicate with the server 10 of the network 300 may comprise one or more voice interfaces, one or more hypertext transfer protocol (HTTP) interfaces, one or more XML configuration access protocol (XCAP) interfaces, one or more application programming interfaces (APIs), such as one or more hypertext transfer protocol representational state transfer application programming interfaces (HTTP-REST APIs), or any other interface of the network 300, or any combination of interfaces of the network 300. In some embodiments, the one or more nodes 42, 44 of the network 300 via which the one or more services 40 can communicate with the server 10 of the network 300 may comprise one or more portals (such as one or more web portals) 42, one or more nodes of a cloud infrastructure 44, or any other node of the network 300, or any combination of nodes of the network 300.

In the embodiment illustrated in FIG. 5, for example, one or more web services 40 may communicate with the server 10 via a HTTP interface, a web portal 42 and a HTTP-REST API. In more detail, the one or more web services 40 can communicate with the web portal 42 via the HTTP interface and the web portal 42 can communicate with the server 10 via the HTTP-REST API. Also in the embodiment illustrated in FIG. 5, one or more personal assistant (PA) services may communicate with the server 10 via a voice interface, a node of a cloud infrastructure 44 and a HTTP-REST API. In more detail, the one or more PA services can communicate with the node of a cloud infrastructure 44 via the HTTP interface and the node of a cloud infrastructure 44 can communicate with the server 10 via the HTTP-REST API.

As illustrated in FIG. 5, in some embodiments, the network 300 may comprise a mobility management entity (MME) node and/or an authentication, authorization, and accounting (AAA) node 50. In these embodiments, the mobility management entity (MME) node and/or the authentication, authorization, and accounting (AAA) node 50 can communicate with the database 20, e.g. via an interface. The mobility management entity (MME) node and/or an authentication, authorization, and accounting (AAA) node 50 can be configured to store information indicative of a current location (e.g. geolocation) of UEs 30. In some embodiments, the mobility management entity (MME) node and/or an authentication, authorization, and accounting (AAA) node 50 can be configured to transmit the information indicative of a current location of UEs 30 to the database 20 of the network 300. The information indicative of a current location of UEs 30 may be transmitted from the mobility management entity (MME) node and/or an authentication, authorization, and accounting (AAA) node 50 in response to a request for the information from the database 20. Thus, in some embodiments, the database 20 of the network 300 may receive the information indicative of a current location of UEs 30 from the mobility management entity (MME) node and/or the authentication, authorization, and accounting (AAA) node 50.

Figure 6:
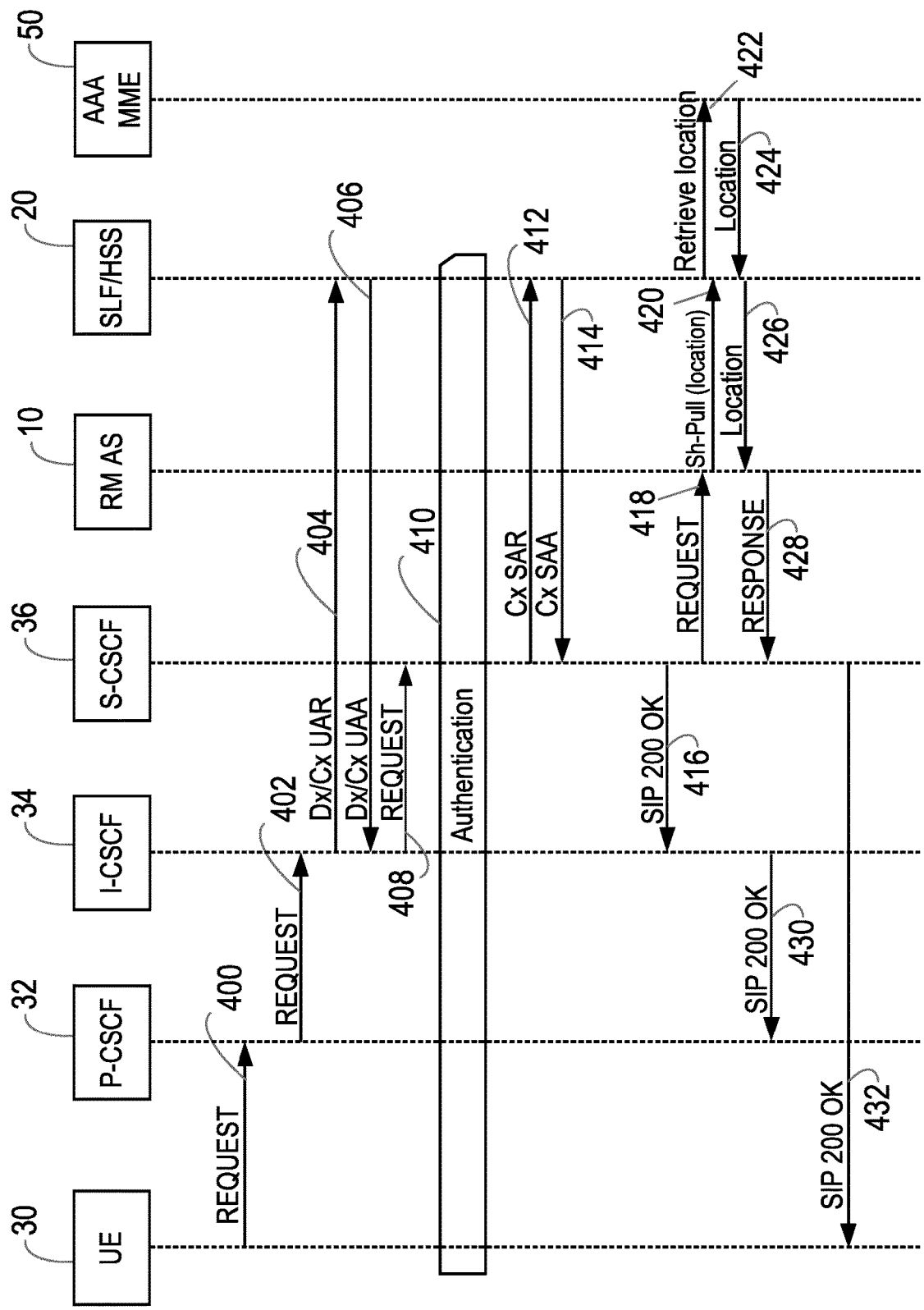
FIG. 6 is a signalling diagram illustrating the signals in a network according to an embodiment.

FIG. 6 is a signalling diagram illustrating the signals in a network 300 in accordance with an embodiment. The network 300 comprises the server 10 (e.g. the RM-AS) and the database 20 (e.g. the SLF or HSS database) described earlier. The network 300 in accordance with this embodiment also comprises a UE 30, a plurality of nodes 32, 34, 36 via which the UE 30 can communicate with the server 10 (such as one or more SIP nodes, e.g. one or more CSCFs, which may comprise any one or more of the P-CSCF 32, the I-CSCF 34 and the S-CSCF 36), and the mobility management entity (MME) node and/or an authentication, authorization, and accounting (AAA) node 50 described earlier. The operation of the network 300 according to the example embodiment will now be described with reference to FIGS. 5 and 6.

The UE 30 transmits a request 400 associated with managing current registrations to services for one or more UEs. For example, the request associated with managing current registrations to services for one or more UEs may be a request to register the one or more UEs to the one or more services 40. The one or more UEs may comprise the UE 30 that transmits the request and/or one or more other UEs. The request 400 is transmitted from the UE 30 to the database 20 (e.g. the SLF or HSS database). The request 400 may be transmitted from the UE 30 directly to the database 20 (e.g. the SLF or HSS database) or indirectly to the database 20 (e.g. the SLF or HSS database) via one or more nodes 32, 34, 36 of the network 300 (such as one or more SIP nodes, e.g. one or more CSCFs, which may comprise any one or more of the P-CSCF 32, the I-CSCF 34 and the S-CSCF 36).

In the example embodiment illustrated in FIG. 6, the request 400 is transmitted from the UE 30 to the P-CSCF 32. The P-CSCF 32 transmits the request 402 to the I-CSCF 34. The I-CSCF 34 transmits a user authorization request (UAR) 404 to the database 20 (e.g. the SLF or HSS database). The UAR 404 is a request for the one or more UEs to access the one or more services 40. The UAR 404 can be transmitted via one or more interfaces, such as via the Dx or Cx interface. The database 20 (e.g. the SLF or HSS database) transmits a user authorization answer (UAA) 406 to the I-CSCF 34, such as via the Dx or Cx interface. The UAA 406 is an answer that indicates whether the UAR 404 is allowed, i.e. whether the one or more UEs are granted access to the one or more services 40. If the UAA 406 indicates that the one or more UEs are granted access to the one or more services 40, the I-CSCF 34 transmits the request 408 associated with managing current registrations to services for one or more UEs to the S-CSCF 36.

At block 410, database 20 (e.g. the SLF or HSS database) authenticates the one or more UEs. The S-CSCF 36 transmits a server assignment request (SAR) 412 to the database 20 (e.g. the SLF or HSS database), such as via the Cx interface. The SAR 412 is a request for the database 20 to store the name of the server that is currently serving the one or more UEs 30. The database 20 (e.g. the SLF or HSS database) transmits a server assignment answer (SAA) 414 to the S-CSCF 36, such as via the Cx interface. The SAA 414 is an answer that indicates the information that the S-CSCF needs in order to provide services 40 to the one or more UEs 30, such as information on the services 40 to which the one or more UEs 30 are subscribed, information indicative of which server (e.g. the server 10) needs to be invoked for the one or more UEs 30 to receive these services 40, or any other information, or any combination of information, needed for the S-CSCF to provide services 40 to the one or more UEs 30. The S-CSCF 36 transmits a response 416 to the I-CSCF 34 that indicates whether the request 400, 402, 408 associated with managing current registrations to services 40 for one or more UEs is successful. The response 416 can, for example, be a session initiation (SIP) 200 OK response.

As described earlier, the server 10 (e.g. the RM-AS), or more specifically a memory 12 of the server 10, receives and stores information indicative of whether UEs are currently registered to a service (blocks 100 and 102 of FIG. 2). The S-CSCF 36 transmits the request 418 associated with managing current registrations to services 40 for one or more UEs to the server 10 (e.g. the RM-AS). Thus, as also described earlier, the server 10 (e.g. the RM-AS), or more specifically the processing circuitry of the server 10, receives the request 418 associated with managing current registrations to services 40 for one or more UEs (block 104 of FIG. 2). The server 10 (e.g. the RM-AS), or more specifically the processing circuitry of the server 10, then initiates an action to manage current registrations to services 40 for one or more UEs in accordance with the request (block 106 of FIG. 2).

In some embodiments, the server 10 (e.g. the RM-AS) may also invoke a procedure 420 by which information indicative of a current location of UEs is read from the database 20 (e.g. the SLF or HSS database). For example, the server 10 (e.g. the RM-AS) may invoke an Sh-Pull procedure 420 to read the information indicative of the current location of UEs from the database 20 (e.g. the SLF or HSS database). In some embodiments, the database 20 (e.g. the SLF or HSS database) may request 422 retrieval of the information indicative of the current location of UEs from the mobility management entity (MME) node and/or an authentication, authorization, and accounting (AAA) node 50. Thus, the mobility management entity (MME) node and/or an authentication, authorization, and accounting (AAA) node 50 may transmit a response 424 with the information indicative of the current location of UEs to the database 20 (e.g. the SLF or HSS database) according to some embodiments.

The database 20 (e.g. the SLF or HSS database) transmits a response 426 with the information indicative of the current location of UEs with the information indicative of a current location of UEs to the server 10 (e.g. the RM-AS). Thus, as described earlier, the server 10 (e.g. the RM-AS), or more specifically a memory 12 of the server 10, can receive and store information indicative of a current location of UEs according to some embodiments.

In some embodiments, the server 10 (e.g. the RM-AS) transmits a response 428 that indicates whether the request 400, 402, 408, 418 associated with managing current registrations to services 40 for one or more UEs is successful. The response 428 may be transmitted from the server 10 (e.g. the RM-AS) to the S-CSCF 36. The I-CSCF 34 transmits a response 430 to the P-CSCF 34 that indicates whether the request 400, 402, 408, 418 associated with managing current registrations to services 40 for one or more UEs is successful. The S-CSCF 36 transmits a response 432 to the UE 30 that indicates whether the request 400, 402, 408, 418 associated with managing current registrations to services 40 for one or more UEs is successful. Any one or more of the responses 430, 432 can be a SIP 200 OK response, for example.

Figure 7:
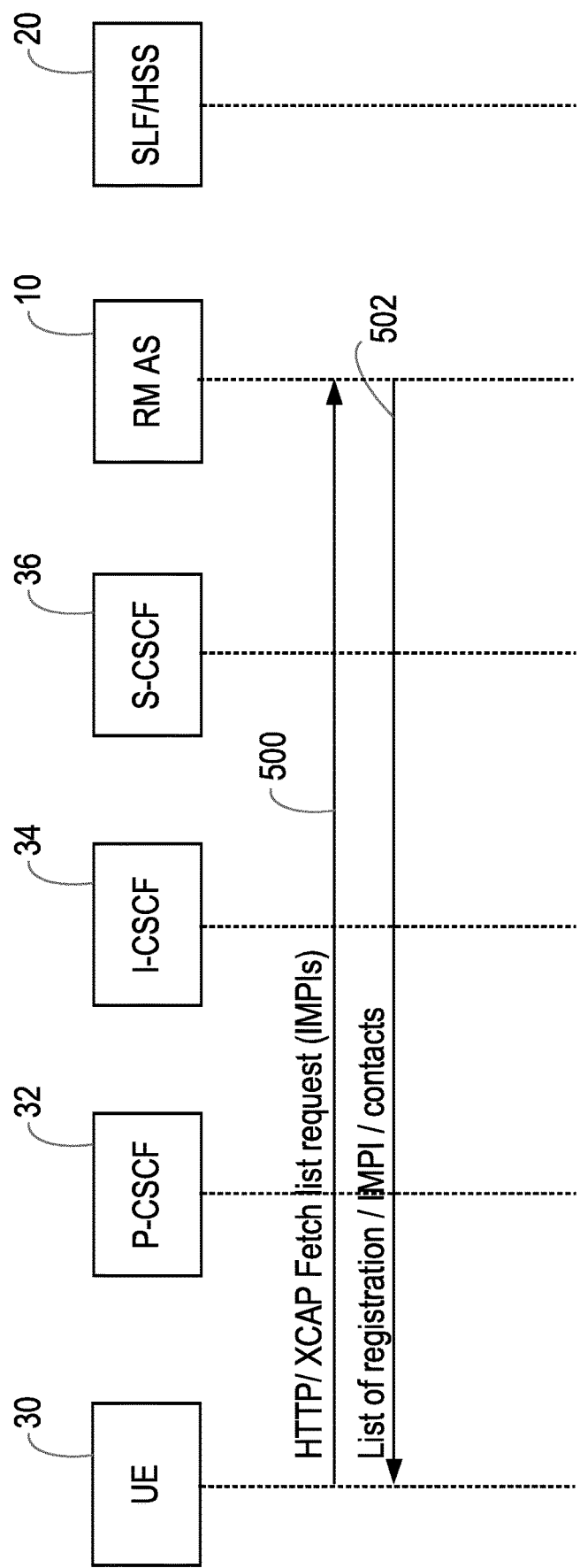
FIG. 7 is a signalling diagram illustrating the signals in a network according to an embodiment.

FIG. 7 is a signalling diagram illustrating the signals in a network 300 in accordance with an embodiment. The network 300 comprises the server 10 (e.g. the RM-AS) and the database 20 (e.g. the SLF or HSS database) described earlier. The network 300 in accordance with this embodiment also comprises a UE 30, a plurality of nodes 32, 34, 36 via which the UE 30 can communicate with the server 10 (such as one or more SIP nodes, e.g. one or more CSCFs, which may comprise any one or more of the P-CSCF 32, the I-CSCF 34 and the S-CSCF 36), and the mobility management entity (MME) node and/or an authentication, authorization, and accounting (AAA) node 50 described earlier. The operation of the network 300 according to the example embodiment will now be described with reference to FIGS. 5 and 7.

As described earlier, the server 10 (e.g. the RM-AS), or more specifically a memory 12 of the server 10, receives and stores information indicative of whether UEs are currently registered to a service (blocks 100 and 102 of FIG. 2).

As illustrated in FIG. 7, the UE 30 transmits a request 500 associated with managing current registrations to services for one or more UEs. The request 500 can be transmitted via an interface of the network 300, such as via a hypertext transfer protocol (HTTP) interface or an XML configuration access protocol (XCAP) interface. In the example embodiment illustrated in FIG. 7, the request 500 associated with managing current registrations to services for one or more UEs is a request 500 for information indicative of whether the one or more UEs are currently registered to a service 40. In some embodiments, the request 100 may be a request for a list of one or more UEs that are currently registered to a service 40 (i.e. a list of active registrations). For example, in some embodiments, the request 500 may be a fetch list request. In some embodiments, the request 500 may comprise an indication of an identity of the one or more UEs, such as an IP multimedia private identity (IMPI) for the one or more UEs. The one or more UEs may comprise the UE 30 that transmits the request and/or one or more other UEs.

The request 500 is transmitted from the UE 30 to the server 10 (e.g. the RM-AS). The request 500 may be transmitted from the UE 30 directly to the server 10 (e.g. the RM-AS) or indirectly to the server 10 (e.g. the RM-AS) via one or more nodes 32, 34, 36 of the network 300 (such as one or more SIP nodes, e.g. one or more CSCFs, which may comprise any one or more of the P-CSCF 32, the I-CSCF 34 and the S-CSCF 36). Thus, as described earlier, the server 10 (e.g. the RM-AS), or more specifically the processing circuitry of the server 10, receives the request associated with managing current registrations to services 40 for one or more UEs (block 104 of FIG. 2). As also described earlier, the server 10 (e.g. the RM-AS), or more specifically the processing circuitry of the server 10, then initiates an action to manage current registrations to services 40 for one or more UEs in accordance with the request (block 106 of FIG. 2).

In the example embodiment illustrated in FIG. 7, initiating the action comprises transmitting information 502 indicative of whether the one or more UEs are currently registered to a service. In some embodiments, the information 502 may comprise a list of one or more UEs that are currently registered to a service 40 (i.e. a list of active registrations). As mentioned earlier, in some embodiments, the server 10 (e.g. the RM-AS), or more specifically a memory 12 of the server 10, may store an indication of an identity of the one or more UEs and/or a contact for the one or more UEs. Thus, in some of these embodiments, the information 502 may comprise an indication of an identity of the one or more UEs currently registered to a service 40 and/or a contact for the one or more UEs currently registered to a service 40.

Figure 8:
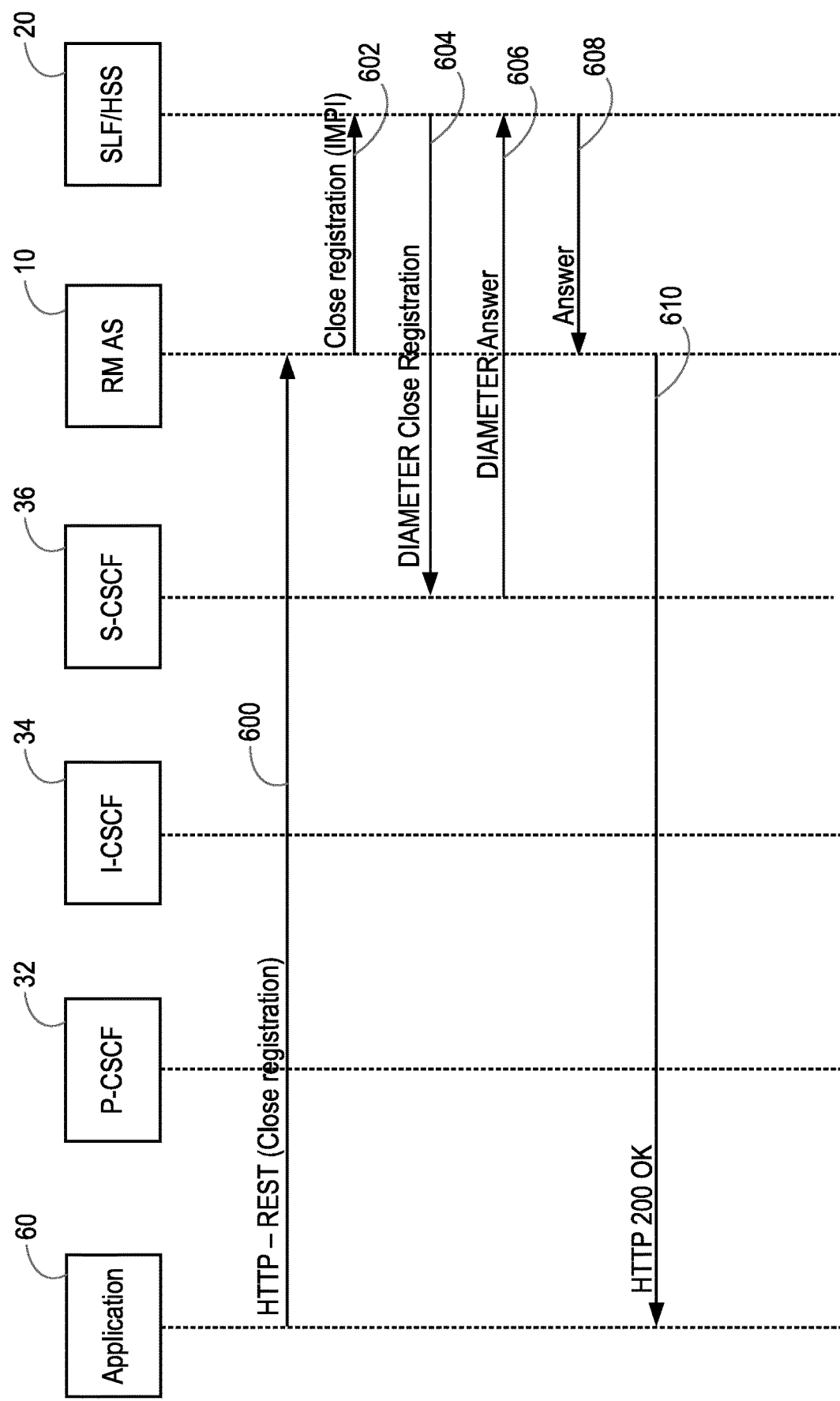
FIG. 8 is a signalling diagram illustrating the signals in a network according to an embodiment.

FIG. 8 is a signalling diagram illustrating the signals in a network 300 in accordance with an embodiment. The network 300 comprises the server 10 (e.g. the RM-AS) and the database 20 (e.g. the SLF or HSS database) described earlier. The network 300 in accordance with this embodiment also comprises an application (e.g. a third party application) 60, a plurality of nodes 32, 34, 36 via which the application 60 can communicate with the server 10 (such as one or more SIP nodes, e.g. one or more CSCFs, which may comprise any one or more of the P-CSCF 32, the I-CSCF 34 and the S-CSCF 36), and the mobility management entity (MME) node and/or an authentication, authorization, and accounting (AAA) node 50 described earlier. The operation of the network 300 according to the example embodiment will now be described with reference to FIGS. 5 and 8.

As described earlier, the server 10 (e.g. the RM-AS), or more specifically a memory 12 of the server 10, receives and stores information indicative of whether UEs 30 are currently registered to a service 40 (blocks 100 and 102 of FIG. 2).

As illustrated in FIG. 8, the application 60 transmits a request 600 associated with managing current registrations to services 40 for one or more UEs 30. The request 600 can be transmitted via an interface of the network 300, such as via a HTTP-REST interface. In the example embodiment illustrated in FIG. 8, the request 600 associated with managing current registrations to services 40 for one or more UEs 30 is a request 600 to deregister a particular UE 30 from a particular service 40 to which the UE 30 is currently registered (i.e. a "close registration" request).

The request 600 is transmitted from the application 60 to the server 10 (e.g. the RM-AS). In some embodiments, the request 600 may comprise an indication of an identity of the UE 30, such as an IP multimedia private identity (IMPI) for the UE 30. In this way, the UE 30 to which the request 600 relates can be identified by the server 10. The request 600 may be transmitted from the application 60 directly to the server 10 (e.g. the RM-AS) or indirectly to the server 10 (e.g. the RM-AS) via one or more nodes 32, 34, 36 of the network 300 (such as one or more SIP nodes, e.g. one or more CSCFs, which may comprise any one or more of the P-CSCF 32, the I-CSCF 34 and the S-CSCF 36). Thus, as described earlier, the server 10 (e.g. the RM-AS), or more specifically the processing circuitry of the server 10, receives the request 600 associated with managing current registrations to services 40 for one or more UEs 30 (block 104 of FIG. 2). As also described earlier, the server 10 (e.g. the RM-AS), or more specifically the processing circuitry of the server 10, then initiates an action to manage current registrations to services 40 for one or more UEs 30 in accordance with the request (block 106 of FIG. 2).

In the example embodiment illustrated in FIG. 8, initiating the action comprises transmitting a command 602 to the database 20 of the network 300. More specifically, the processing circuitry 14 of the server 10 can be configured to transmit the command 602 to the database 20 (e.g. the SLF or HSS database). The command instructs the database to initiate the action. In the example embodiment illustrated in FIG. 8, the command 602 instructs the database 20 to deregister the UE 30 from the service 40 to which the UE 30 is currently registered. The command 602 may be referred to as a "close registration" command 602. In some embodiments, the command 602 can comprise an indication of an identity of the UE 30, such as an IMPI for the UE 30.

In the example embodiment illustrated in FIG. 8, the database 20 deregisters the UE 30 from the service 40 to which the UE 30 is currently registered by requesting the deregistration to a node 38 of the network 300, which is a serving call session control function (S-CSCF) 38 in this embodiment. Thus, the database 20 transmits a request 604 to the S-CSCF 38 to deregister the UE 30 from the service 40. The request 604 may be transmitted according to the Diameter protocol. The request 604 can be transmitted via an interface of the network 300, such as via the Cx interface. The request 604 can comprise the indication of the identity of the UE 30, such as the IMPI for the UE 30. The S-CSCF 38 deregistered the UE 30 from the service 40. The S-CSCF 38 transmits a notification (or answer) 606 to the database 20 to confirm that deregistration is successful. The notification 606 may be transmitted according to the Diameter protocol. The S-CSCF can update information stored in the database 20 to de-register the UE 30 from the service 40.

The database 20 transmits a notification (or answer) 608 to the server 10 to confirm that deregistration is successful. The server 10 transmits a notification 610 to the application 60 to confirm that deregistration is successful. The notification 610 can be transmitted via an interface of the network 300, such as via the HTTP-REST interface. The notification 610 can, for example, be a session initiation (SIP) 200 OK response.

Figure 9:
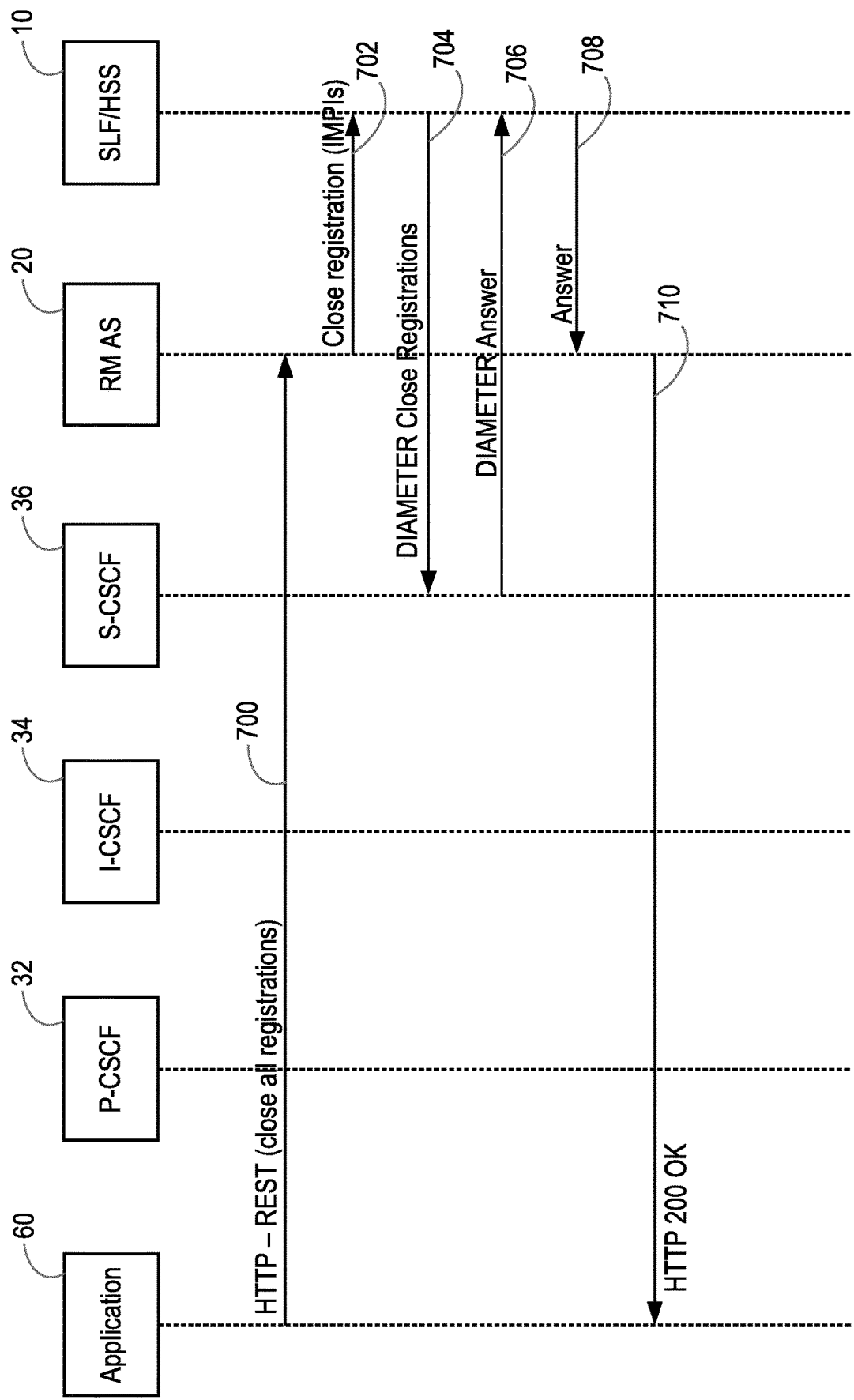
FIG. 9 is a signalling diagram illustrating the signals in a network according to an embodiment.

FIG. 9 is a signalling diagram illustrating the signals in a network 300 in accordance with an embodiment. The signalling diagram according to this embodiment is the same as the signalling diagram according to the embodiment illustrated in FIG. 8 and thus the corresponding description will be understood to also apply to FIG. 9. That is, the signals 700, 702, 704, 706, 708, 710 of FIG. 9 correspond to the signals 600, 602, 604, 606, 608, 610 of FIG. 8 respectively. However, in the embodiment illustrated in FIG. 9, the request 700 associated with managing current registrations to services 40 for one or more UEs 30 is a request 700 to deregister a UE 30 from all services 40 to which the UE 30 is currently registered and the result is thus that the UE 30 is deregistered from all services 40.

FIGS. 8 and 9 provide signalling diagrams for embodiments involving deregistering one or more UEs 30 from one or more services 40. It will be understood that similar signalling diagrams can be provided for embodiments involving barring or unbarring one or more UEs 30 from one or more services 40.

In some embodiments, a user may access the UE registrations management service provided by the server 10 via a web robot (or BoT), such as a digital assistant (PA). The BoT may be an OTT BoT according to some embodiments. A user may communicate with the BoT in any way, e.g. using voice control, touch control, etc. Example dialogues between the BoT and the user will now be provided. For example, in order to check UE registrations, a user may say to the BoT "tell me which devices I am registered in" and the BoT may respond with "you are registered in 5 devices. The devices are: 1) TV in the sitting room; 2) your laptop at work; 3) your phone; 4) your watch; 5) your tablet". In order to deregister a specific UE, the user may say to the BoT "please deregister device 4" or "please deregister my watch" and the BoT may respond with "you are deregistered from your watch". In order to deregister all UEs, the user may say to the BoT "please deregister all my devices" and the BoT may respond with "all your devices have been deregistered".

Figure 10:
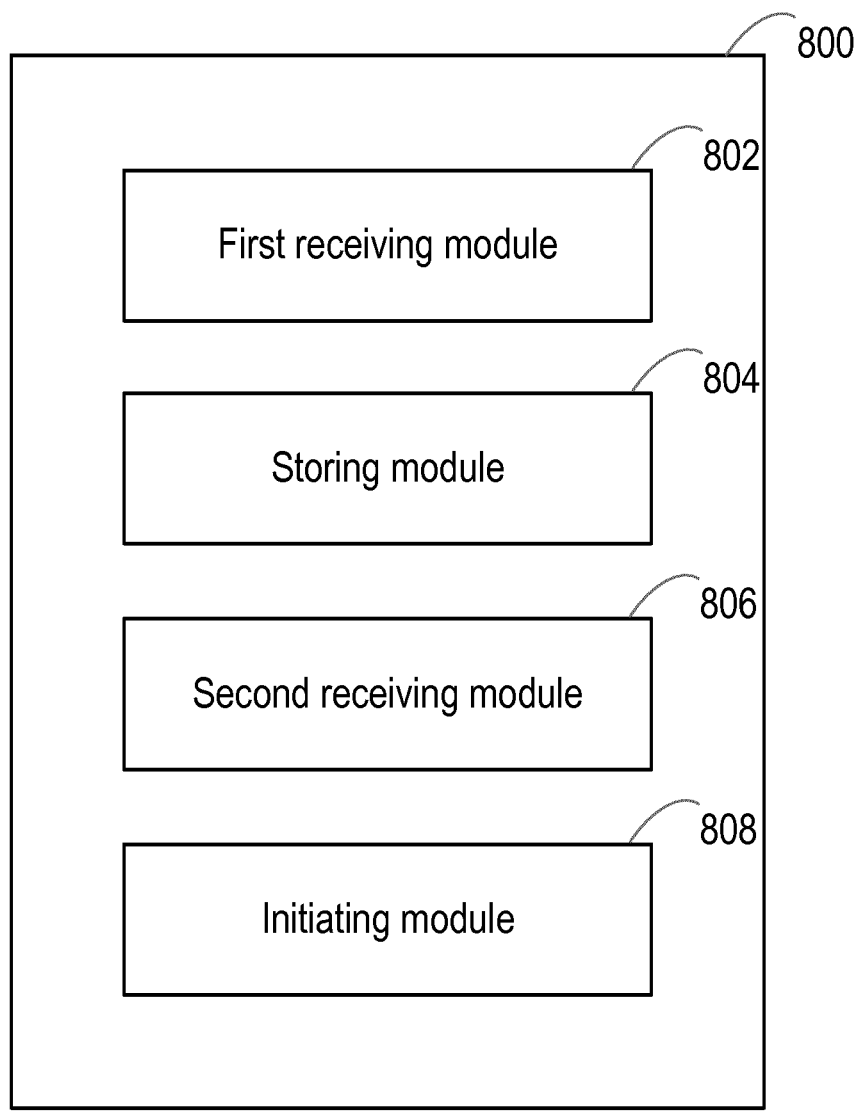
FIG. 10 is a block diagram illustrating a server according to an embodiment.

FIG. 10 is a block diagram illustrating a server 800 of a network in accordance with an embodiment. The server 800 comprises a first receiving module 802 configured to receive information indicative of whether UEs are currently registered to a service. The server 800 comprises a storing module 804 configured to store the received information indicative of whether UEs are currently registered to a service. The server 800 comprises a second receiving module 806 configured to receive a request associated with managing current registrations to services for one or more UEs. The server 800 comprises an initiating module 808 configured to initiate an action to manage current registrations to services for one or more UEs in accordance with the request.

Figure 11:
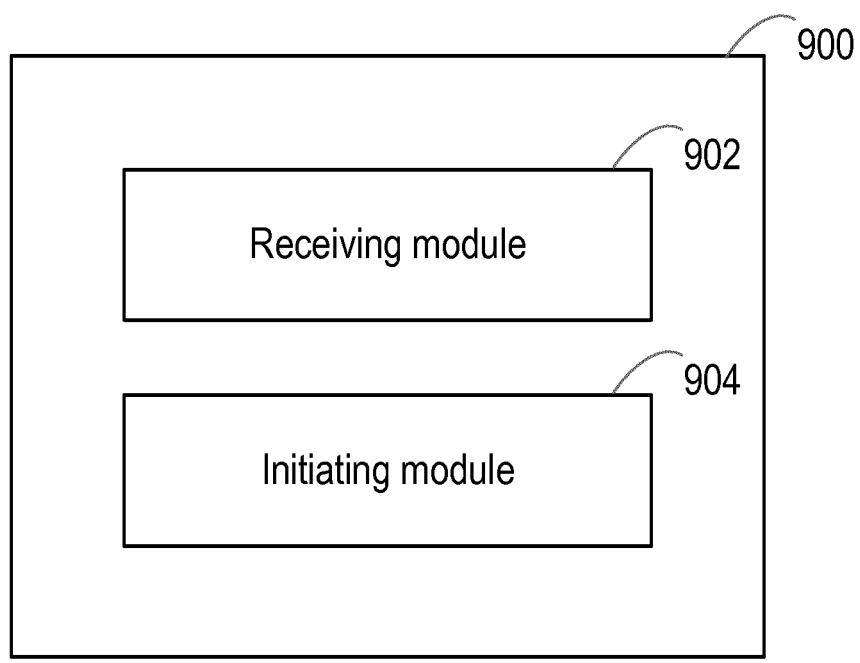
FIG. 11 is a block diagram illustrating a database according to an embodiment.

FIG. 11 is a block diagram illustrating a database 900 of a network in accordance with an embodiment. The database 900 comprises a receiving module 902 configured to receive a command from a server of the network. The command instructs the database to initiate an action in accordance with a request received by the server and associated with managing current registrations to services for one or more UEs. The database 900 comprises an initiating module 904 configured to initiate the action to manage current registrations to services for one or more UEs in accordance with the request.

The network functionality described herein can be performed by hardware. Thus, the network 300 described herein can be a hardware network. For example, the server 10, 800 can be a hardware server, the database 20, 900 can be a hardware database, and/or any one or more of the other nodes 32, 34, 36, 42, 44, 50 of the network 300 can be hardware nodes. However, it will also be understood that at least part or all of the network functionality described herein can be virtualized. For example, the functions performed within the network 300 (e.g. by any one or more of the server 10, 800, the database 20, 900, and other nodes 32, 34, 36, 42, 44, 50) can be implemented in software running on generic hardware that is configured to orchestrate the network functionality. Thus, in some embodiments, the server 10, 800 can be a virtual server, the database 20, 900 can be a virtual database, and/or any one or more of the other nodes 32, 34, 36, 42, 44, 50 of the network 300 can be virtual nodes. In some embodiments, at least part or all of the network functionality described herein may be performed in a network enabled cloud.

There is also provided a computer program product comprising a carrier containing instructions for causing processing circuitry to perform at least part of the method described herein. In some embodiments, the carrier can be any one of an electronic signal, an optical signal, an electromagnetic signal, an electrical signal, a radio signal, a microwave signal, or a computer-readable storage medium.

Therefore, in the manner described herein, it is possible for a user to centrally manage their UE registrations. In this way, a user has more control of their UEs and the registrations of those UEs to services. The UE registrations can advantageously be managed irrespective of their location with respect to the UEs in a simple and yet effective manner. The UE registrations can also be managed from any UE and thus not only from the UE for which a registration to a service is to be managed. An optimized self-management of UE registrations is realised in this way. There is thus provided herein an improved mechanism for managing UE registrations. More specifically, a network exposure mechanism is provided. The exposed mechanism allows application logic for the self-management of UE registrations to be built on top of a core network (e.g. an IMS core network).

It will be understood that at least some or all of the method steps described herein can be automated according to some embodiments. That is, in some embodiments, at least some or all of the method steps described herein can be performed automatically. As such, an automated method for UE registrations management can be provided. In this way, a user can automatically or on command manage their UE registrations in the manner described herein.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of operating a server of a network for managing user equipment registrations, the method comprising:
receiving information indicative of whether user equipments are currently registered to a service;
storing the received information indicative of whether user equipments are currently registered to a service;
receiving a request associated with managing current registrations to services for one or more user equipments; and
initiating an action to manage current registrations to services for one or more user equipments in accordance with the request, the initiating comprising:
transmitting a command to a database of the network, the database being configured to manage user equipment registrations, and the command being configured to instruct the database to initiate the action;
wherein the request comprises a request to bar one or more user equipments from one or more services to which the one or more user equipments are currently registered; and
wherein the command instructs the database to bar the one or more user equipments from the one or more services to which the one or more user equipments are currently registered.

2. The method as claimed in claim 1, wherein:
the request comprises a request for information indicative of whether the one or more user equipments are currently registered to a service; and
initiating the action comprises transmitting information indicative of whether the one or more user equipments are currently registered to a service.

3. The method as claimed in claim 2, the method comprising:
receiving information indicative of a current location of user equipments;
storing the received information indicative of a current location of user equipments; and
wherein initiating the action comprises transmitting information indicative of the current location of the one or more user equipments currently registered to a service.

4. The method as claimed in claim 1, wherein:
the request comprises:
a request to deregister one or more user equipments from one or more services to which the one or more user equipments are currently registered; and
the command instructs the database to:
deregister the one or more user equipments from the one or more services to which the one or more user equipments are currently registered.

5. The method as claimed in claim 1, wherein:
the request comprises:
a request to unbar one or more user equipments from one or more services to which the one or more user equipments are currently registered; and
the command instructs the database to:
unbar the one or more user equipments from the one or more services to which the one or more user equipments are currently registered.

6. The method as claimed in claim 1, wherein the method comprises:
storing an indication of an identity of the one or more user equipments and/or a contact for the one or more user equipments.

7. The method as claimed in claim 1, wherein receiving the request comprises receiving the request from an application.

8. The method as claimed in claim 7, wherein:
the request is input by the application at a northbound interface; and
the northbound interface has a login mechanism for the application to input the request that is separate to a login mechanism for the application to register one or more user equipments to one or more services.

9. The method as claimed in claim 7, wherein the application is an over-the-top (OTT) application.

10. The method as claimed in claim 1, wherein receiving the request comprises receiving the request from a user equipment.

11. The method as claimed in claim 10, wherein:
the request is input by a user at a user interface; and
the user interface has a login mechanism for the user to input the request that is separate to a login mechanism for the user to register one or more user equipments to one or more services.

12. A server of a network, wherein the server comprises:
a memory configured to:
receive information indicative of whether user equipments are currently registered to a service;
store the received information indicative of whether user equipments are currently registered to a service; and
processing circuitry configured to:
receive a request associated with managing current registrations to services for one or more user equipments; and
initiate an action to manage current registrations to services for one or more user equipments in accordance with the request, the initiating comprising:
transmitting a command to a database of the network, the database being configured to manage user equipment registrations, and the command being configured to instruct the database to initiate the action;
wherein the request comprises a request to bar one or more user equipments from one or more services to which the one or more user equipments are currently registered; and
wherein the command instructs the database to bar the one or more user equipments from the one or more services to which the one or more user equipments are currently registered.

13. A method of operating a database of a network for managing user equipments, the method comprising:

receiving a command from a server of the network, wherein the command instructs the database to initiate an action in accordance with a request received by the server and associated with managing current registrations to one or more services for one or more user equipments, and wherein the command instructs the database to bar the one or more user equipments from the one or more services to which the one or more user equipments are currently registered;

initiating the action to manage current registrations to services for one or more user equipments in accordance with the request; and barring the one or more user equipments from the one or more services to which the one or more user equipments are currently registered.

14. A database of a network, wherein the database is configured to:

receive a command from a server of the network, wherein the command instructs the database to initiate an action in accordance with a request received by the server and associated with managing current registrations to one or more services for one or more user equipments, and wherein the command instructs the database to bar the one or more user equipments from the one or more services to which the one or more user equipments are currently registered;

initiate the action to manage current registrations to services for one or more user equipments in accordance with the request; and bar the one or more user equipments from the one or more services to which the one or more user equipments are currently registered.

* * * * *